United States Patent
Conti et al.

(10) Patent No.: US 9,468,339 B2
(45) Date of Patent: Oct. 18, 2016

(54) LOW PROFILE SIDE DRIVE BLENDING APPLIANCE

(71) Applicant: Whirlpool Corporation, Benton Harbor, MI (US)

(72) Inventors: Michael P. Conti, St. Joseph, MI (US); Steve C. Drees, Stevensville, MI (US); Brandon T. Mock, St. Joseph, MI (US); Leif A. Norland, St. Joseph, MI (US); Paul S. Paget, Kalamazoo, MI (US); Mitchell L. Robertson, Elkhart, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 97 days.

(21) Appl. No.: 14/210,515

(22) Filed: Mar. 14, 2014

(65) Prior Publication Data
US 2014/0269155 A1   Sep. 18, 2014

Related U.S. Application Data

(60) Provisional application No. 61/793,359, filed on Mar. 15, 2013.

(51) Int. Cl.
*A47J 43/07* (2006.01)
*A47J 43/042* (2006.01)
*A47J 27/00* (2006.01)

(52) U.S. Cl.
CPC ............... *A47J 43/07* (2013.01); *A47J 27/004* (2013.01); *A47J 43/042* (2013.01); *A47J 43/0727* (2013.01)

(58) Field of Classification Search
CPC ..... A47J 43/07; A47J 43/042; A47J 43/0727
See application file for complete search history.

(56) References Cited

U.S. PATENT DOCUMENTS

| | | | |
|---|---|---|---|
| 2,549,121 | A | 4/1951 | Osterheld |
| 2,666,354 | A | 10/1953 | Murray |
| 2,702,571 | A | 2/1955 | Murray |
| 3,140,079 | A | 7/1964 | Baermann |
| 3,168,294 | A | 2/1965 | Hasumura |
| 3,887,169 | A | 6/1975 | Maynard |
| 3,951,351 | A | 4/1976 | Ernster et al. |

(Continued)

FOREIGN PATENT DOCUMENTS

| | | |
|---|---|---|
| DE | 102011052745 A1 | 2/2013 |
| EP | 1139839 B1 | 10/2001 |

(Continued)

OTHER PUBLICATIONS

European Patent Appl. No. 14160043.7 filed Mar. 17, 2014, Applicant: Whirlpool Corporation, European Search Report re: same, mail date: Jun. 25, 2014.

*Primary Examiner* — Tony G Soohoo
*Assistant Examiner* — Elizabeth Insler

(57) ABSTRACT

A blending appliance having a housing includes a motor compartment and a jar receiving portion spaced laterally from the motor compartment. The housing includes an upper retaining member and a support pad extending outwardly from the housing, such that a jar receiving portion is defined therebetween. A motor is disposed in the motor compartment. A jar includes a lid with a feed chute. Together, the jar and lid are configured for reception in the jar receiving portion of the housing. The lid is vertically secured onto the jar by the upper retaining member upon reception of the jar into the jar receiving portion.

18 Claims, 7 Drawing Sheets

(56) References Cited

U.S. PATENT DOCUMENTS

| | | | |
|---|---|---|---|
| 4,071,789 A | 1/1978 | Ernster et al. |
| 4,078,246 A | 3/1978 | Berthoux et al. |
| 4,111,372 A | 9/1978 | Hicks et al. |
| 4,174,073 A | 11/1979 | Maher et al. |
| 4,285,473 A | 8/1981 | Williams |
| 4,286,885 A | 9/1981 | Uibel et al. |
| 4,381,048 A | 4/1983 | Haverkamp et al. |
| 4,422,343 A | 12/1983 | Falkenbach et al. |
| 4,501,538 A | 2/1985 | Bray et al. |
| 4,600,155 A | 7/1986 | Bos et al. |
| 4,613,086 A | 9/1986 | Granum et al. |
| 4,620,479 A | 11/1986 | Diamond et al. |
| 4,629,131 A | 12/1986 | Podell |
| 4,647,727 A | 3/1987 | Sontheimer |
| 4,653,519 A | 3/1987 | Kanner |
| 4,706,896 A | 11/1987 | Moon-Kau |
| 4,734,604 A | 3/1988 | Sontheimer et al. |
| 4,822,172 A | 4/1989 | Stottmann |
| 4,824,029 A | 4/1989 | Stottmann et al. |
| 5,323,691 A | 6/1994 | Reese et al. |
| 5,325,643 A | 7/1994 | Mitchell et al. |
| 5,353,697 A * | 10/1994 | Venturati | A47J 43/046 241/37.5 |
| 5,395,060 A | 3/1995 | Hackel et al. |
| 5,407,272 A | 4/1995 | Meier |
| 5,486,050 A | 1/1996 | Lenting |
| 5,524,530 A | 6/1996 | Nijzingh et al. |
| 5,556,198 A | 9/1996 | Dickson, Jr. et al. |
| 5,758,965 A | 6/1998 | Gambrill et al. |
| 5,779,359 A | 7/1998 | Gambrill et al. |
| 5,809,872 A * | 9/1998 | Sundquist | A47J 43/046 241/37.5 |
| 5,980,099 A * | 11/1999 | Soon | B01F 15/00448 366/204 |
| 6,095,677 A | 8/2000 | Karkos, Jr. et al. |
| 6,189,441 B1 | 2/2001 | Beaudet et al. |
| 6,210,033 B1 | 4/2001 | Karkos, Jr. et al. |
| 6,318,247 B1 | 11/2001 | Di Nunzio et al. |
| 6,325,312 B1 | 12/2001 | Karkos, Jr. |
| 6,336,603 B1 | 1/2002 | Karkos, Jr. et al. |
| 6,364,522 B2 | 4/2002 | Kolar et al. |
| 6,402,365 B1 | 6/2002 | Wong |
| 6,513,966 B1 | 2/2003 | Gort-Barten et al. |
| 6,588,930 B2 | 7/2003 | Wilson |
| 6,632,013 B2 | 10/2003 | Wulf et al. |
| 6,634,580 B2 | 10/2003 | Obersteiner |
| 6,641,298 B2 | 11/2003 | Safont et al. |
| 6,748,853 B1 | 6/2004 | Brady et al. |
| 6,793,167 B2 | 9/2004 | Karkos, Jr. et al. |
| 6,889,924 B2 * | 5/2005 | Pavlovic | A47J 43/0716 241/285.2 |
| 7,318,375 B2 | 1/2008 | Huang |
| 7,354,192 B2 | 4/2008 | Jejcic |
| 7,387,430 B2 | 6/2008 | Short et al. |
| 7,448,789 B2 | 11/2008 | Boquet et al. |
| 7,632,007 B2 | 12/2009 | Wulf et al. |
| 7,708,215 B2 | 5/2010 | Wang |
| 7,942,094 B2 | 5/2011 | Kounlavong et al. |
| 7,993,054 B2 | 8/2011 | Wulf et al. |
| 8,042,990 B2 | 10/2011 | Pryor, Jr. et al. |
| 8,056,848 B1 | 11/2011 | Liang |
| 8,087,818 B2 | 1/2012 | Drees |
| 8,109,668 B2 | 2/2012 | Garman et al. |
| 8,282,268 B2 | 10/2012 | Karkos, Jr. et al. |
| 8,282,269 B2 | 10/2012 | Terentiev |
| 2001/0002892 A1 | 6/2001 | Karkos, Jr. et al. |
| 2002/0079393 A1 | 6/2002 | Karkos, Jr. et al. |
| 2005/0023193 A1 | 2/2005 | Kim |
| 2006/0092761 A1 | 5/2006 | Terentiev |
| 2006/0158958 A1 | 7/2006 | Romanik |
| 2007/0140048 A1 | 6/2007 | Ismail |
| 2007/0286015 A1 | 12/2007 | Markle |
| 2008/0008028 A1 | 1/2008 | Terentiev et al. |
| 2008/0255636 A1 | 10/2008 | DelMain et al. |
| 2009/0308265 A1 | 12/2009 | Obersteiner |
| 2011/0046786 A1 | 2/2011 | Wulf et al. |
| 2011/0063941 A1 | 3/2011 | Seidler et al. |
| 2011/0079596 A1 | 4/2011 | Krasznai et al. |
| 2011/0203462 A1 | 8/2011 | Boussemart et al. |
| 2011/0293807 A1 | 12/2011 | Dushine et al. |
| 2012/0002501 A1 | 1/2012 | Ulstad et al. |
| 2012/0027331 A1 | 2/2012 | Liang |
| 2012/0085851 A1 | 4/2012 | Allen |
| 2012/0192727 A1 | 8/2012 | Wu |
| 2012/0294111 A1 | 11/2012 | Rosengren et al. |
| 2013/0001220 A1 | 1/2013 | Vidal et al. |
| 2013/0028044 A1 | 1/2013 | Karkos, Jr. et al. |
| 2013/0134245 A1 | 5/2013 | Gushwa |
| 2013/0220764 A1 | 8/2013 | Choi et al. |

FOREIGN PATENT DOCUMENTS

| | | |
|---|---|---|
| EP | 1562461 B1 | 8/2005 |
| EP | 2005867 A1 | 12/2008 |
| EP | 2545830 A1 | 1/2013 |

* cited by examiner

US 9,468,339 B2

1

LOW PROFILE SIDE DRIVE BLENDING APPLIANCE

RELATED APPLICATION

This application claims priority to and the benefit under 35 U.S.C. §119(e) of U.S. Provisional Patent Application No. 61/793,359, filed Mar. 15, 2013, entitled "LOW PROFILE SIDE DRIVE BLENDING APPLIANCE," which is hereby incorporated herein by reference in its entirety.

BACKGROUND

The present concept generally relates to a blending appliance, and more particularly to a low profile side drive blending appliance.

SUMMARY

One aspect of the present concept includes a blending appliance having a housing including a motor compartment and a jar receiving portion spaced laterally therefrom. The housing further includes an upper retaining member. A motor is disposed in the motor compartment. A support pad is operably coupled to the housing. A jar includes a lid with a feed chute. The jar and lid are configured for reception in the jar receiving portion. The lid is vertically secured onto the jar by the upper retaining member upon reception of the jar into the jar receiving portion.

Another aspect of the present concept includes a blending appliance having a housing with an upper retaining portion and a base portion, wherein a jar receiving portion is defined between the upper retaining portion and the base portion. The jar receiving portion is configured to laterally receive a jar for blending. An open recess is disposed on the upper retaining member and opens into the jar receiving portion of the housing. A lid includes a feed chute and is adapted to be received on an open upper end of the jar. The lid is vertically secured onto the jar by the upper retaining member upon reception of the jar into the jar receiving portion of the housing. The feed chute of the lid is aligned with and accessible from the open recess of the upper retaining member upon reception of the jar into the jar receiving portion.

Yet another aspect of the present concept includes a blending appliance having a housing with a motor compartment and a jar receiving portion. An upper retaining member extends laterally from the housing over the jar receiving portion. A motor is disposed in the motor compartment. A support pad extends laterally from the housing below the jar receiving portion. A jar defines a blending cavity with a blade assembly disposed in the blending cavity. The jar is configured for lateral reception in the jar receiving portion, and the blade assembly is in driven engagement with the motor upon reception of the jar in the jar receiving portion.

These and other aspects, objects, and features of the present concept will be understood and appreciated by those skilled in the art upon studying the following specification, claims, and drawings.

2

Figure 1:
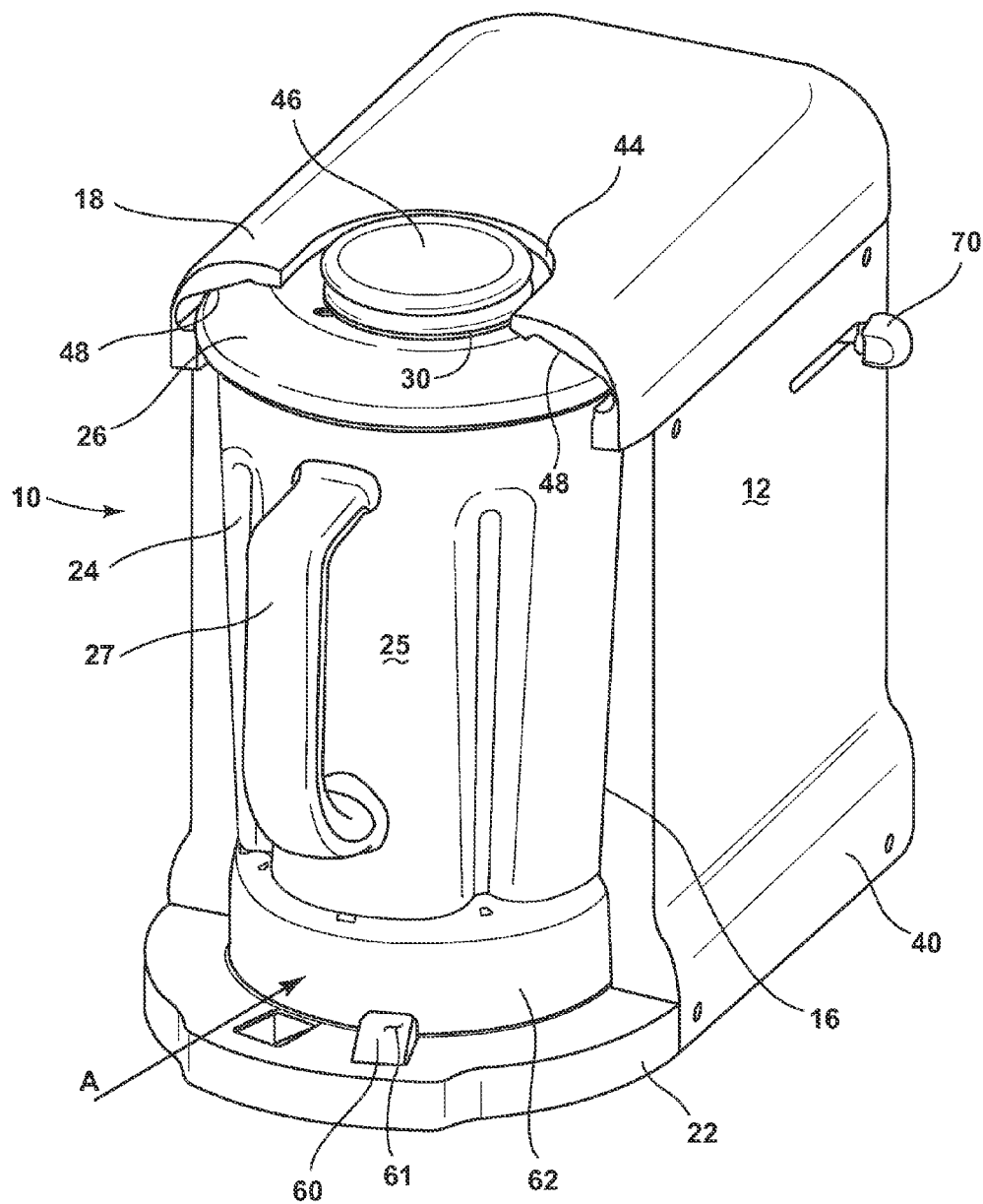
FIG. 1 is a top perspective view of one embodiment of a low profile side drive blending appliance of the present concept.
Figure 2:
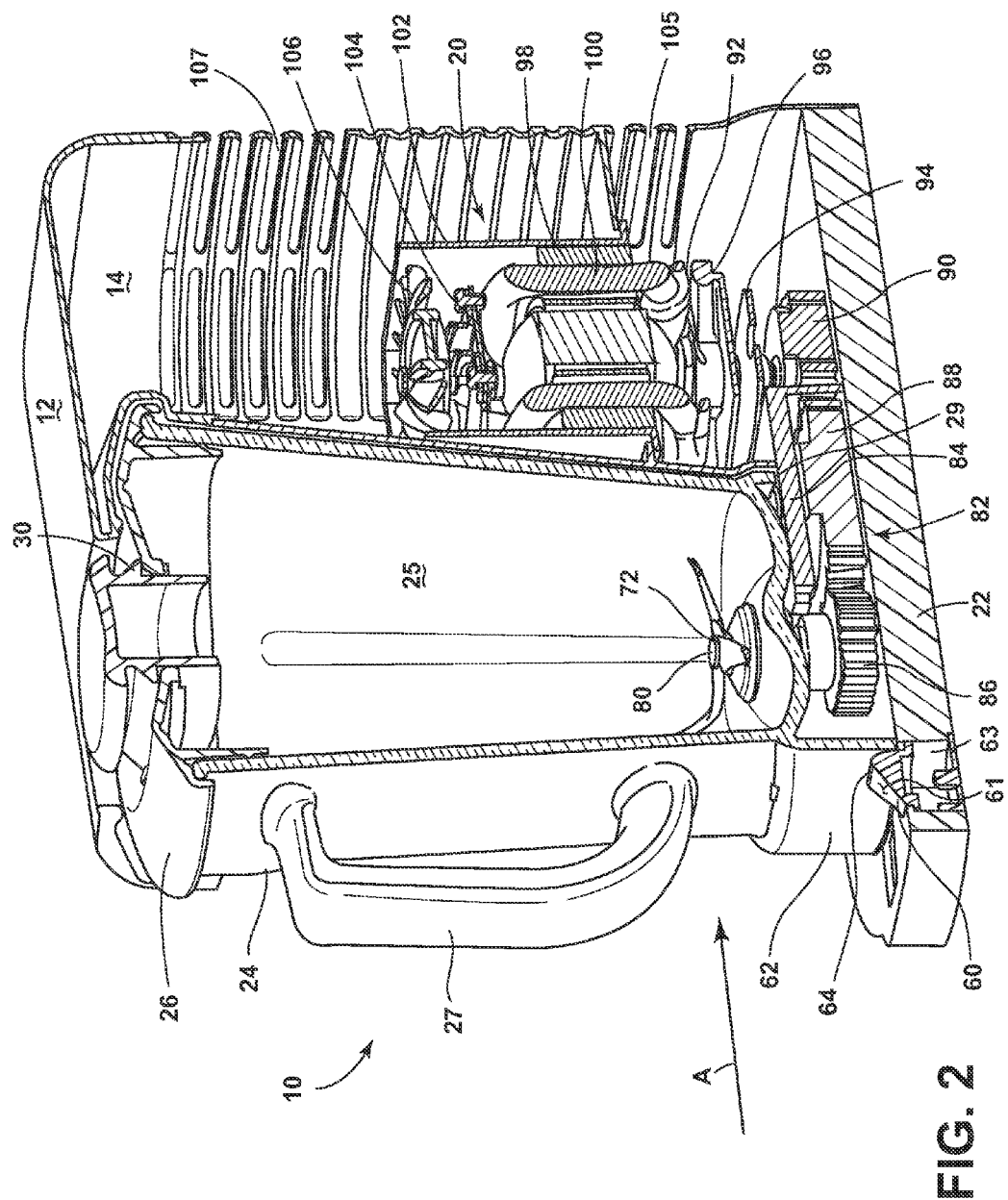
Figure 3:
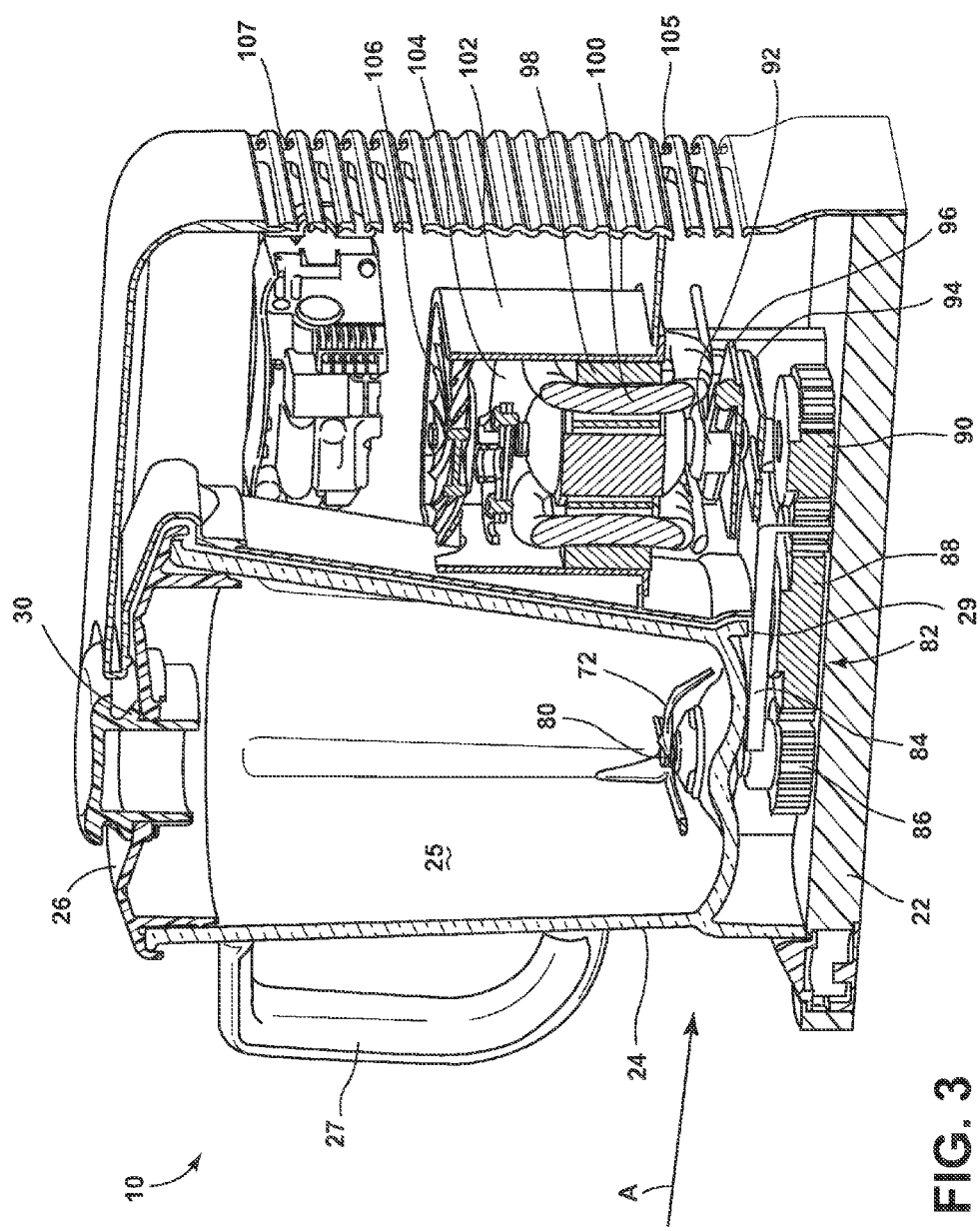
Figure 4:
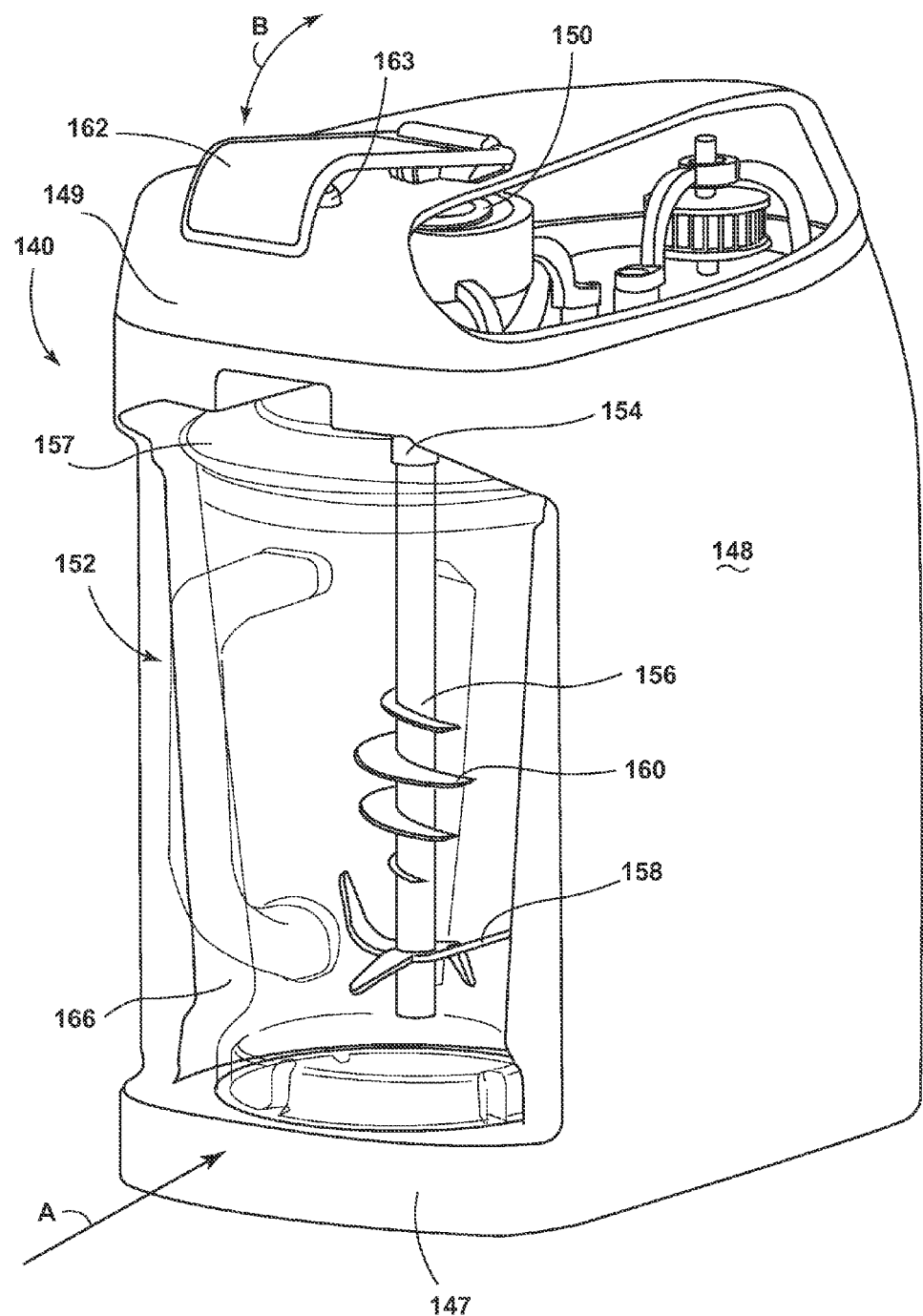
Figure 5:
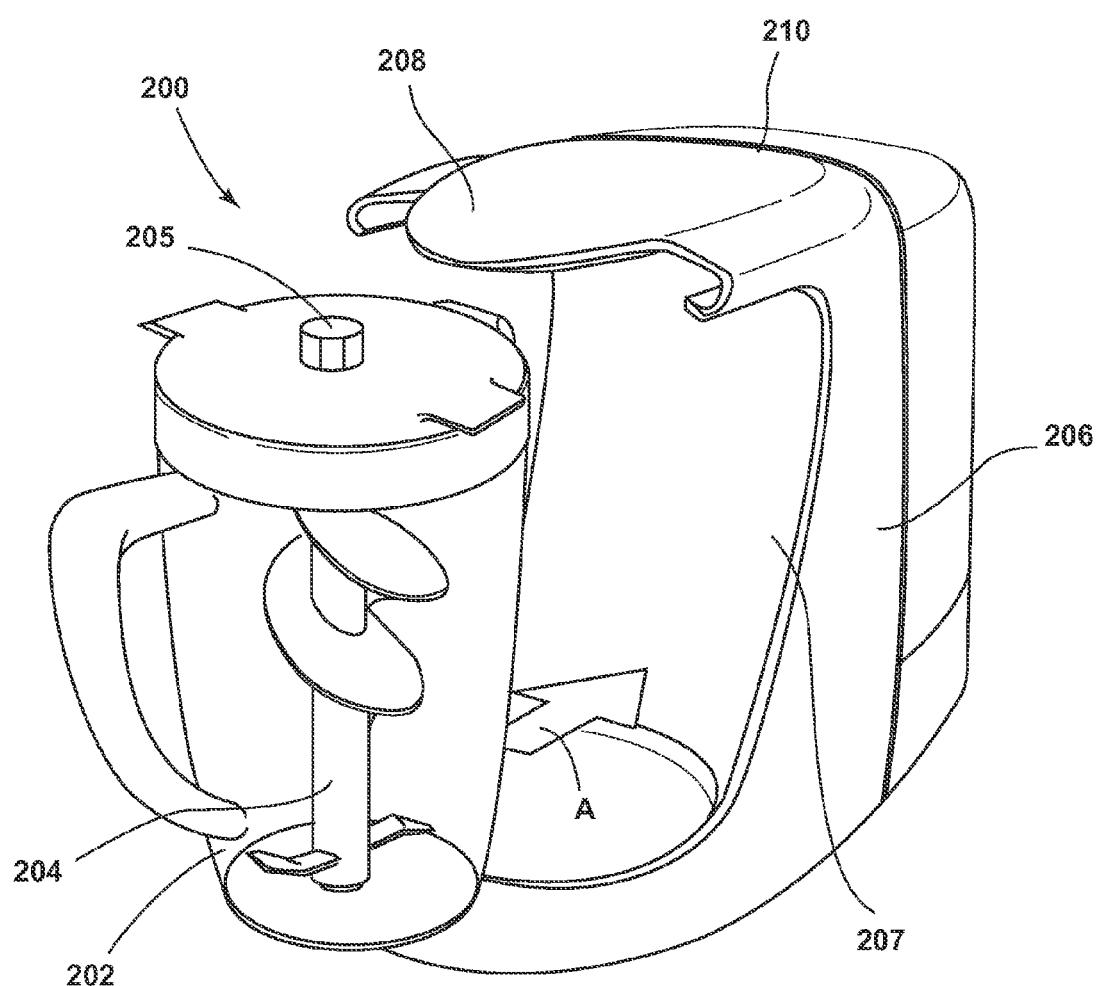
Figure 6:
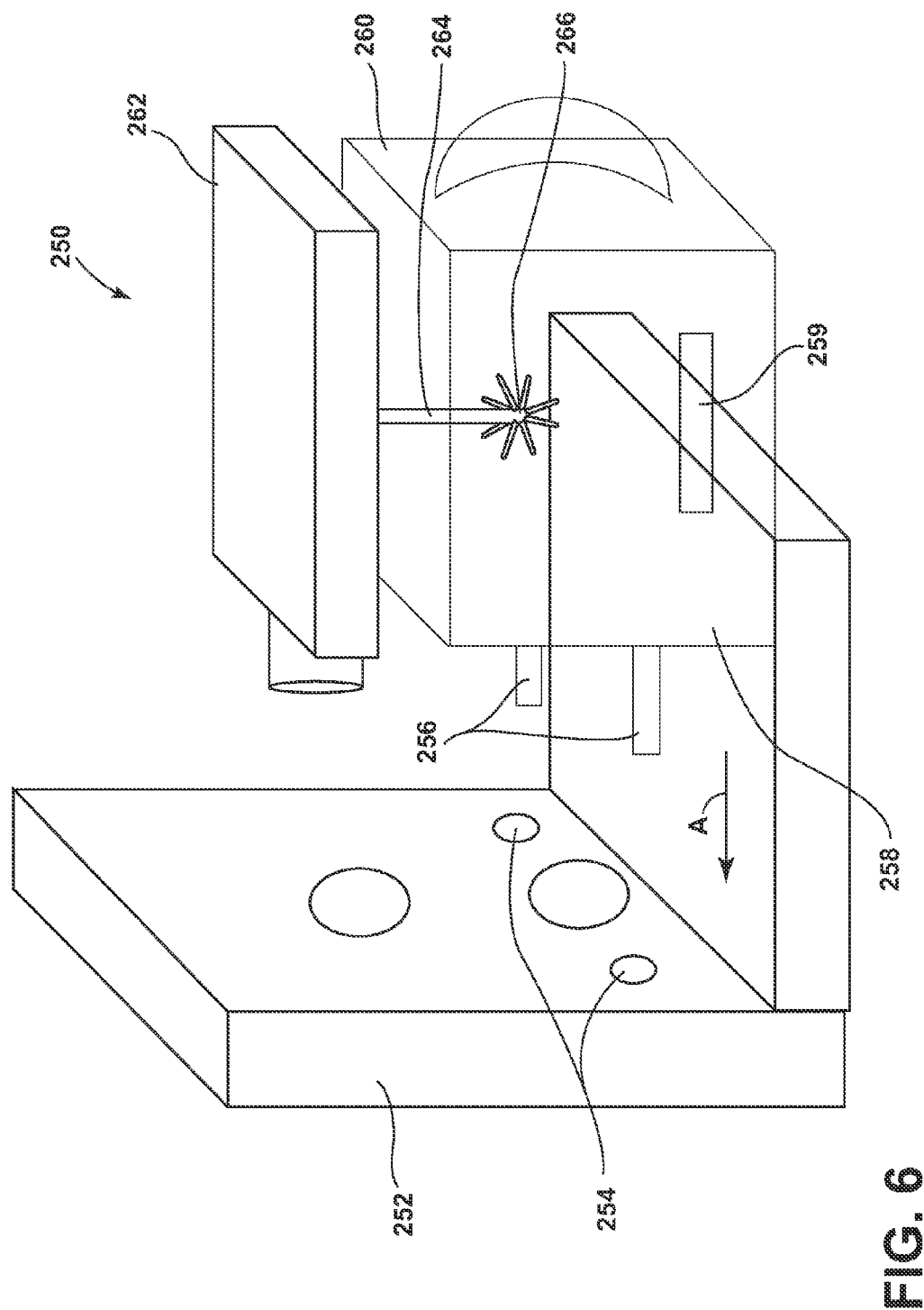
Figure 7:
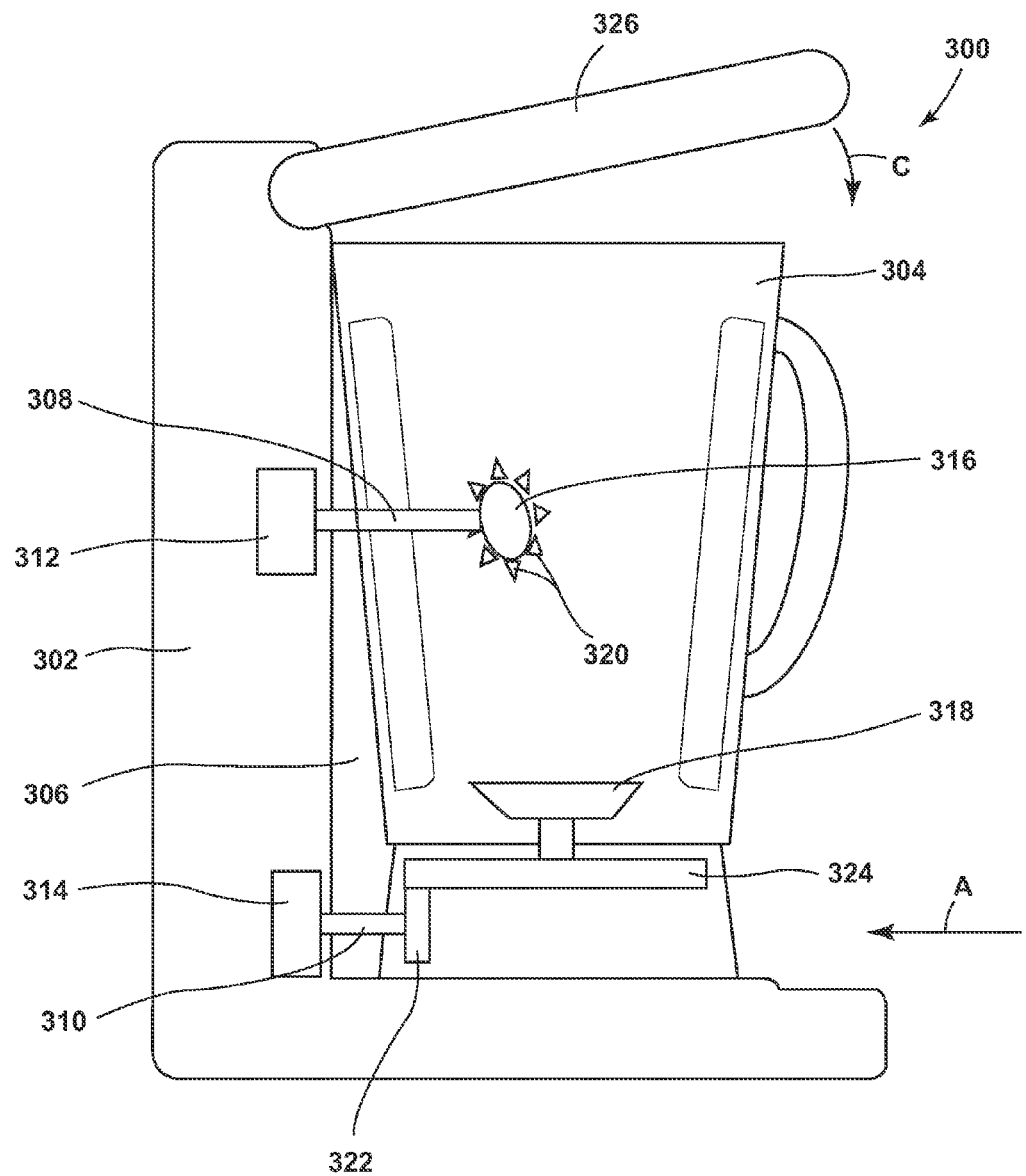

FIG. 2 is a top perspective cross-sectional view of the low profile side drive blending appliance of FIG. 1;

FIG. 3 is a rear perspective cross-sectional view of the low profile side drive blending appliance of FIG. 1;

FIG. 4 is a top perspective view of another embodiment of a low profile side drive blending appliance;

FIG. 5 is a top perspective view of yet another embodiment of a low profile side drive blending appliance;

FIG. 6 is a side elevational view of yet another embodiment of a low profile side drive blending appliance; and FIG. 7 is a top perspective view of still another embodiment of a low profile side drive blending appliance.

DETAILED DESCRIPTION

For purposes of description herein, the terms "upper," "lower," "right," "left," "rear," "front," "vertical," "horizontal," and derivatives thereof shall relate to the concept as oriented in FIG. 1. However, it is to be understood that the concept may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-3, reference numeral 10 generally designates a blending appliance having a housing 12 including a motor compartment 14 and a jar receiving portion 16 spaced laterally therefrom and which defines a cavity. The jar receiving portion 16 includes an upper retaining member 18. A motor 20 is disposed in the motor compartment 14. A support pad 22 is operably coupled to the housing 12. A jar 24 includes a lid 26 with a feed chute 30. The lid 26 is adapted to close an open upper end of the jar 24, and the jar 24 and lid 26 are further configured for reception in the jar receiving portion 16 of the housing 12. The lid 26 is vertically secured or otherwise retained on the jar 24 by the upper retaining member 18 upon reception of the jar 24 in the jar receiving portion 16.

Referring again to FIGS. 1-3, the illustrated blending appliance is generally configured to include a low profile to easily accommodate use under a cupboard or shelf in a kitchen area. The jar 24 of the blending appliance 10 is designed to engage the housing 12 from a lateral direction. Most traditional blending appliances include a construction that mandates vertical or drop-in placement of a jar onto a base that includes a motor therein. In such a configuration, the jar is generally disposed directly on top of the drive motor in a driven engagement to power a blade assembly disposed in the jar. Unfortunately, these constructions require substantial vertical space above the base and motor compartment, and when connected with a jar, provide for a very tall appliance that is not easily accessible, and must generally be placed in an open environment away from cabinetry unlike the present concept disclosed herein.

As shown in the illustrated embodiment of FIG. 1, the housing 12 includes a slightly widened housing base 40 with the support pad 22 extending laterally outward from the base 40, such that the support pad 22 is disposed below the upper retaining member 18. The upper retaining member 18 is designed to maintain the lid 26 of the jar 24 on the jar 24 during mixing of food goods inside a blending cavity 25 of the jar 24. In the illustrated embodiment, the upper retaining member 18 includes an arcuate recess 44 configured to receive at least a portion of the feed chute 30 that extends through the lid 26. The feed chute 30 includes a removable cap 46. The removable cap 46 can be removed from the lid 26, such that the blending cavity 25 of the jar 24 is accessible for receiving ingredients when the jar 24 is connected with the housing 12. As noted above, the lid 26 is adapted to be received on an open upper end of the jar 24 and vertically secured on the jar 24 by the upper retaining member 18 upon reception of the jar 24 into the jar receiving portion 16 of the housing 12. As the jar 24 is received in the housing 12, the feed chute 30 of the lid 26 is aligned with the arcuate recess 44 of the upper retaining member 18, such that the feed chute 30 is still accessible upon reception of the jar 24 in the jar receiving portion 16.

The jar 24 is connected with the housing 12 as fully received in the jar receiving portion 16. A tapered internal wall 48 is disposed on either side of the arcuate recess 44 of the upper retaining member 18. The tapered internal wall 48 of the housing 12 allows for quick and easy lateral insertion of the jar 24 and lid 26 into the jar receiving portion 16 of the housing 12, and at the same time, prevents the lid 26 from disengaging with an upper open end of the jar 24 when the blending appliance 10 is activated during a blending procedure. As shown, the support pad 22 extends laterally from the housing 12 and generally defines a base that supports the jar 24 when the jar 24 is engaged in the blending appliance 10. The base may include a heating element disposed therein adapted to warm or heat food goods located inside the blending appliance 10.

As shown in FIGS. 1 and 2, the support pad 22 includes a jar lock 60. The jar lock 60 defines a jar base retaining feature that is designed to engage a jar base 62 when the jar 24 is fully received in the jar receiving portion 16, such that the jar 24 does not move away from or otherwise disengage the housing 12 during activation of the blending appliance 10. As shown in FIGS. 1 and 2, the jar lock 60 is a wedged member having a ramped upper surface 61. In this way, as the jar 24 is received in the jar receiving area 16 of the housing 12, the jar base 62 will contact the ramped upper surface 61 of the jar lock 60 to depress the jar lock 60 into a disengaged position within the support pad 22. It is contemplated that the jar lock 60 may be spring-biased to a raised position or engaged position, as shown in FIGS. 1 and 2, such that after lateral insertion of the jar 24 into the housing 12 along a path indicated by arrow A, the jar lock 60 will spring upward to securely engage the jar base 62 and retain the jar 24 in the housing 12. To remove the jar 24, a user would simply push down on the spring-biased jar lock 60 until a top edge 64 of the jar lock 60 is positioned below a bottom surface of the jar base 62. After the jar lock 60 has been moved to this lowered position in a recess 63 disposed in the support pad 22, the jar 24 can safely be removed laterally from the housing 12 by engaging a handle member 27.

Referring again to FIG. 1, a slider switch 70 is disposed on a side of the housing 12. The slider switch 70 has the effect of controlling the speed of the motor 20, as shown in FIG. 2, disposed inside the motor compartment 14 of the housing 12. The slider switch 70, and therefore, the speed control, is generally linear in the illustrated embodiment. However, it is also contemplated that knobs or other electrical or mechanical user interface assemblies may be utilized to control the rate or speed of the motor 20. In the illustrated embodiment, the slider switch 70 is designed to control the motor speed, and consequently, a blade assembly 72 disposed inside the blending cavity 25 of the jar 24 from slow to chop, chop to mix, mix to puree, and puree to liquefy. It is contemplated that the slider switch 70 may have incremental activation points, or may include a continuous electrical switch that allows any of an infinite number of motor speeds to be selected by the user.

Referring now to FIGS. 2 and 3, the inner componentry of the blending appliance 10 of the illustrated embodiment will be discussed. As illustrated, the blade assembly 72 of the blending appliance 10 is fixedly engaged with a jar drive shaft 80. The jar drive shaft 80 extends downward through a bottom portion of the jar 24 and is sealed by gaskets. The lower portion of the jar drive shaft 80 is coupled to a gear assembly 82 disposed below the jar. The gear assembly 82 is positioned above the support pad 22 in a gear housing 84. In the illustrated embodiment, there are three gears that relay rotational forces from the motor 20 to the blade assembly 72. However, it is contemplated that more or less gears may be utilized in the blending appliance 10 for powering the same. In addition, it is also contemplated that a belt driven system or a magnetic coupling system may be utilized with the present concept. In the illustrated embodiment, a jar drive gear 86 is coupled to the jar drive shaft 80 and is accessible from an opening 29 disposed in the jar base 62 on an opposite side of jar 24 relative to the handle member 27. When the jar 24 is fully received in the jar receiving portion 16 of the housing 12, the gear housing 84 is received within the opening 29, such that the jar drive gear 86 is rotatably engaged with a transition gear 88 housed within the gear housing 84. The transition gear 88 is operably engaged with a motor drive gear 90. The motor drive gear 90 is fixedly connected with a drive shaft 92 that extends downwardly from the motor 20. The drive shaft 92 is supported by a drive shaft bracket 94. In this way, the blade assembly 72 is in driven engagement with the motor 20 for rotation within the blending cavity 25 when the jar 24 is fully received in the jar receiving portion 16 of the housing 12. In assembly, the entire motor assembly 20 is supported over a motor bracket 96 inside the motor compartment 14. In the illustrated embodiment, the motor 20 includes a magnet 98 and a winding assembly 100 that is protected by a motor shroud 102. The motor shroud 102 protects the motor 20 and keeps it free of moisture and debris. A shroud bracket 104 is disposed inside the motor shroud 102 and supports a fan assembly 106 disposed above the motor 20. The fan assembly 106 moves air inside the motor compartment 14 and also draws air from the environment into the motor compartment 14 through vents 105 to be expelled through vents 107, thereby preventing or minimizing the likelihood of the motor 20 overheating. It is contemplated that the fan 106 can be disposed above or below the motor 20 for ventilating the motor compartment 14.

Referring now to FIG. 4, another embodiment of a blending appliance 140 includes a housing 148 having an upper retaining member 149 and a base portion 147 extending laterally outward therefrom. A motor system 150 is positioned above a jar 152 in the upper retaining member 149. The jar 152 is laterally received in a jar receiving portion 166 which is defined between the upper retaining member 149 and the base portion 147. The jar 152 includes a drive shaft 154 that is operably engaged with a vertically extending auger 156 that extends into the jar 152 under a lid 157 of the jar 152. The vertically extending auger 156 is fixedly engaged with a blade assembly 158 disposed at the bottom portion of the jar 152. The vertically extending auger 156 also includes a helical flange 160 that extends about a portion of the vertically extending auger 156, and which minimizes bridging of blender contents during blending by providing directional flow. The upper retaining member 149 of the housing 148 of the blending appliance 140 illustrated in FIG. 4 includes a locking tab 162 that locks the jar 152 and the vertically extending auger 156 in place in connection with the housing 148. In use, a user would insert the jar 152 into the jar receiving portion 166 of the housing 148 from a lateral direction indicated by arrow A. After insertion, the locking tab 162 would be moved to a lower locking position, such that the vertically extending auger 156 is engaged, and the jar 152 is secured in place in the jar receiving portion 166 of the housing 148. As the locking tab 162 is moved downwardly towards the locked position, an interlock button 163 is engaged, thereby providing electrical power to the motor system 150 of the appliance 140. At this point, a user is free to operate the motor system 150 at any of a variety of speeds as the lid 157 of the jar 152 is secure on the jar 152.

In another embodiment, as illustrated in FIG. 5, a blending appliance 200 includes a jar 202 having an auger 204 disposed inside the jar 202. The jar 202 is configured for lateral reception with a housing 206 along a path indicated by arrow A towards a jar receiving portion 207, and driven engagement with a motor of the blending appliance 200 when fully received therein. In this embodiment, the housing 206 includes an engagement member 208 that extends forward from a top portion 210 of the housing 206 and is configured to receive a top portion 205 of the auger 204. Upon reception of the top portion 205 of the auger 204, a motor system can be activated, which will subsequently drive the auger 204 for rotation inside the jar 202.

With reference now to FIG. 6, another embodiment of the present concept includes a blending appliance 250 that includes a housing 252 with female receiving ports 254 configured to receive male extensions 256 that protrude from a base 258 of a blending jar 260. The male extensions 256 act as power relays configured to activate a heating element 259 disposed in the base 258 of the blending jar 260. The base 258 of the blending jar 260 can then serve to warm ingredients disposed inside the blending jar 260. Controls for a desired temperature of the heating element 259 disposed in the blending jar 260 may be provided on the housing 252 of the blending appliance 250, or on the blending jar 260 itself. This embodiment also includes a top mounted motor system 262 with a drive shaft 264 that extends downward into the blending jar 260. The drive shaft 264 is operably coupled to a blade assembly 266 for blending the contents of the jar 260 during a blending procedure.

Referring now to FIG. 7, in yet another embodiment, a blending appliance 300 includes a housing 302 and a blending jar 304 configured for lateral engagement with the housing 302 along a path indicated by arrow A. The blending jar 304 can be fit into a jar receiving portion 306 of the housing 302. As the blending jar 304 slides into the jar receiving portion 306 of the housing 302, upper and lower drive shafts 308, 310 that extend from the blending jar 304 engage first and second drive assemblies 312, 314, respectively, in the housing 302. Accordingly, food goods disposed inside the blending jar 304 can be blended by an upper blending assembly 316 operably coupled with the upper drive shaft 308, as well as a lower blending assembly 318 operably coupled with the lower drive shaft 310. The upper blending assembly 316 includes a plurality of blades 320. The lower blending assembly 318 includes a vertical transition gear 322 rotatably engaged with a horizontal drive gear 324 that is fixedly coupled with the lower blending assembly 318. Controls for operating the upper and lower blending assemblies 316, 318 can be disposed on either the housing 302 or the blending jar 304. The blending appliance 300 of FIG. 7 further includes a latching upper retaining member 326 that is moveable between latched and unlatched positions along a path indicated by arrow C. In the latched position, the upper retaining member 326 retains the jar 304 in the housing 302.

It is contemplated that for any of the embodiments disclosed herein that the drive system could include a series of gears or belts, as generally described. In addition, a magnet drive system may also be utilized that does not include a physical coupling system. In this instance, the blade assembly inside the blender jar would be driven by opposing magnetic forces. The drive system would include a disc with magnets driven by a motor through a belt or gear drive. The jar would also include a disc with magnets that is driven by the motor driven disc.

With regard to all of these embodiments, it is contemplated that various components of certain embodiments may be utilized across different embodiments. For example, the auger assembly generally illustrated in the embodiments of FIGS. 4 and 5 could also be utilized in the first embodiment shown in FIGS. 1-3 to minimizing food bridging. In addition, for each of the embodiments disclosed herein, the blending appliance 10 is designed for unassisted operational blending. More specifically, a user can insert a jar into a jar receiving portion, and once the jar is received in the jar receiving portion, the jar can be secured in place via the upper locking tab or the base jar lock. The user can then activate the blending appliance 10 and leave the area. Monitored blending of the blending appliance is not required. In addition, because of the construction of the blending appliances disclosed herein, and the lateral insertion of the jar into the jar receiving portion, a low profile blending appliance can be maintained that is aesthetically pleasing and does not require substantial vertical space above the blending appliance 10.

It is also important to note that the construction and arrangement of the elements of the concept as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present concept. The exemplary structures and processes disclosed herein are for illustrative purposes and are not to be construed as limiting.

It is also to be understood that variations and modifications can be made on the aforementioned structures and methods without departing from the concepts of the present concept, and further it is to be understood that such concepts are intended to be covered by the following claims unless these claims by their language expressly state otherwise.

What is claimed is:

1. A blending appliance comprising:
   a housing having a motor compartment and a jar receiving portion spaced laterally therefrom, the housing further including an upper retaining member fixed in a laterally extending position from the housing, the upper retaining member having a recess disposed therethrough;
   a motor disposed in the motor compartment;
   a support pad operably coupled to the housing and extending outwardly therefrom; and
   a jar having a lid with a feed chute, the jar and lid being configured for lateral reception in the jar receiving portion, wherein the lid is vertically secured onto the jar by the upper retaining member upon reception of the jar into the jar receiving portion, and further wherein a portion of the feed chute is received in the recess such that the feed chute is accessible when the jar is received in the jar receiving area.

2. The blending appliance of claim 1, further comprising:
   a blade assembly disposed in the jar, wherein the blade assembly is operably coupled with the motor.

3. The blending appliance of claim 1, further comprising:
   a slide switch operably coupled with the motor and configured to control an operating speed of the motor.

4. The blending appliance of claim 1, wherein the support pad includes a jar base retaining feature configured to engage a base of the jar when the jar is positioned in the jar receiving portion.

5. The blending appliance of claim 4, wherein the base retaining feature is a jar lock that is operably between engaged and disengaged positions, and further wherein the jar lock is biased towards the engaged position.

6. The blending appliance of claim 1, further comprising:
   an auger that extends vertically into the jar and which is operably coupled with the motor in a driven engagement.

7. The blending appliance of claim 6, wherein the auger is rotatably engaged with the lid of the jar.

8. The blending appliance of claim 7, wherein the auger includes a helical flange extending around the auger.

9. The blending appliance of claim 8, further comprising:
   a locking tab extending over the jar receiving portion and configured to engage the auger.

10. A blending appliance comprising:
    a housing having an upper retaining portion fixed in a laterally extending position from the housing and a base portion with a jar receiving portion defined therebetween, the jar receiving portion configured to laterally receive a jar therein;
    an open recess disposed on the upper retaining member, the open recess opening into the jar receiving portion from the upper retaining member; and
    a lid with a feed chute disposed thereon, the lid adapted to be received on an open upper end of the jar, wherein the lid is vertically secured onto the jar by the upper retaining member upon reception of the jar into the jar receiving portion, and further wherein the feed chute of the lid is aligned with the open recess of the upper retaining member upon reception of the jar in the jar receiving portion.

11. The blending appliance of claim 10, wherein the jar defines a blending cavity that is accessible through the feed chute of the lid upon reception of the jar into the jar receiving portion.

12. The blending appliance of claim 11, further comprising:
    a blade assembly disposed within the blending cavity, wherein the blade assembly is operably coupled in a driven engagement to a motor disposed in the housing.

13. The blending appliance of claim 12, wherein the jar further includes a jar base having an opening providing access to a jar drive gear, the jar drive gear coupled to a drive shaft which is further coupled to the blade assembly.

14. The blending appliance of claim 13, further comprising:
    a gear assembly disposed within a gear housing and operably coupled to the jar drive gear at a first end and further coupled to a downwardly extending drive shaft of the motor at a second end.

15. A blending appliance comprising:
    a housing having a motor compartment and a jar receiving portion;
    an upper retaining member fixed in a laterally extending position from the housing over the jar receiving portion, the upper retaining member having a recess disposed therethrough;
    a motor disposed in the motor compartment;
    a support pad extending laterally from the housing below the jar receiving portion; and
    a jar defining a blending cavity with a blade assembly disposed therein, the jar configured for lateral reception in the jar receiving portion, wherein the blade assembly is in driven engagement with the motor upon reception of the jar in the jar receiving portion.

16. The blending appliance of claim 15, wherein the jar receiving portion is spaced laterally from the motor compartment.

17. The blending appliance of claim 16, wherein the support pad includes a jar base retaining feature configured to engage a base of the jar when the jar is positioned in the jar receiving portion.

18. The blending appliance of claim 15, further comprising:
    a jar base having a heating element disposed therein.

* * * * *